United States Patent Office

2,849,420
Patented Aug. 26, 1958

2,849,420

RUBBER STABILIZED WITH METALLIC SYMMETRICAL DISUBSTITUTED THIOUREA COMPOUND

Henry P. Stevens, Akron, Ohio, Lloyd O. Bentz, York, Pa., and Harry E. Albert, Akron, Ohio, assignors to The Firestone Tire & Rubber Company, Akron, Ohio, a corporation of Ohio No Drawing. Application July 24, 1953
Serial No. 370,209

18 Claims. (Cl. 260—45.75)

This invention relates to inhibition of the deteriorating action of ozone on vulcanized rubber compositions. The rubber compositions may be those used in tires, inner tubes, rubber thread and other products from latexes, and other rubber articles. The compositions consist essentially of natural rubber or a sulfur-vulcanizable synthetic rubber polymer of butadiene or an alkyl derivative thereof, or copolymer of butadiene or an alkyl derivative thereof with a vinyl comonomer, or a mixture of any of these rubbers. The inhibitors belong to the general class of metallic compounds of symmetrical dialkyl thioureas and this general class of compounds is claimed herein as a part of the invention.

The deterioration of rubber is due to various factors and is evidenced in different ways. The inhibitors of this invention have been found to absorb or destroy ozone and thus prevent or inhibit its deteriorating action on rubber. These inhibitors are bivalent nickel, cadmium, lead, tin and zinc compounds of symmetrical dialkyl and dicycloalkyl thioureas. The compounds can be salts or they can be adducts formed with a halide, nitrate, acetate or other salt of the bivalent metal.

The alkyl and cycloalkyl substituents of the disubstituted thioureas can be the same or different. They can comprise up to nine carbon atoms. They can be alicyclic, straight chain or branched chain, and they can contain substituents such as one or more hydroxyl groups, halogen atoms, aryl groups, etc. Thus, the invention includes the use of the bivalent nickel, calcium, lead, tin and zinc compounds of dimethyl thiourea, diethyl thiourea, the dipropyl thioureas, the dibutyl thioureas, the diamyl thioureas, dicyclopentyl thiourea, the dihexyl thioureas, dicyclohexyl thiourea, the diheptyl thioureas, the dioctyl thioureas, N,N'-di(hydroxyethyl)thiourea, N,N'-di(chloroethyl)thiourea, ethylbutyl thiourea and other mixed and substituted thioureas, etc. The dialkyl and dicycloalkyl substituents of longer chain length show no advantages over the enumerated compounds.

The preparation of the disubstituted thioureas and the formation of metallic compounds therefrom is illustrated by the following:

*Preparation of N,N'-diethyl thiourea*

In a liter, 3 neck flask with stirrer, thermometer, and dropping funnel was placed 2.0 moles (90 g.) or 129 g. of 70% monoethylamine to which was slowly added 1.0 mole (76 g.) of carbon disulfide. No solvent was used. A white solid formed which was dissolved in 200 ml. alcohol and refluxed 24 hours to drive off the hydrogen sulfide. When the alcohol solution was cooled, white crystals formed which were filtered, washed with water and dried. M. P.—77–79° C., Wt.=35 g.

*Preparation of N,N'-diisopropyl thiourea*

The directions of Schmidt and Striewsky, Ber. 74B, 1285 (1941), were used. In a 1 l., 3 neck flask with stirrer, thermometer, and dropping funnel was placed 1.0 mole (59 g.) of isopropylamine dissolved in 100 ml. of cold benzene. This was treated slowly with .62 mole (47 g.) of carbon disulfide in 250 ml. of benzene. The temperature rose steadily, but was not allowed to exceed 40° C. The mixture stood 12 hours at room temperature, then it was refluxed 30 hours. When cooled, white shiny crystals formed which were filtered, washed and dried. Wt.=80 g.; M. P.=140–141° C.

*Preparation of cadmium chloride adduct of N,N'-diethyl thiourea*

A water solution of 0.10 mole N,N'-diethyl thiourea was added to a water solution of 0.10 mole $CdCl_2$. A white solid crystallized out. The solid was filtered off and dried in air. Melting point of the solid was 117° C.

*Preparation of zinc chloride adduct of N,N'-diisopropyl thiourea*

Equimolecular quantities of N,N'-diisopropyl thiourea and zinc chloride were mixed in acetone solution and allowed to stand until the acetate evaporated. A white solid resulted.

The foregoing illustrate the preparation of the metal chloride and bromide adducts.

*Preparation of cadmium salt of N,N'-diisopropyl thiourea*

An alcohol solution of sodium ethylate was formed by dissolving 0.10 mole sodium in absolute alcohol. Diisopropyl thiourea (0.10 mole) was added, and then a water solution of 0.05 mole $CdCl_2$. The white precipitate which formed was filtered and dried in air.

*Preparation of nickel salt of N,N'-diethyl thiourea*

N,N'-diethyl thiourea (0.10 mole or 13.2 g.) was dissolved in 40 ml. of 10% NaOH (0.10 mole). Then a water solution of 12 g. (0.05 mole) of $NiCl_2 \cdot 6H_2O$ was added. A green precipitate was separated by filtration and this was dried. The product weighed 18.5 grams, M. P. 60–65° C.

The foregoing are illustrative of the preparation of salts of the symmetrical disubstituted thioureas from such salts as the chloride, bromide, nitrate and acetate of nickel, cadmium, zinc, tin and lead. The salts are free of inorganic acid radicals.

The foregoing preparations are illustrative and other procedures can be employed. Suitable solvents will be used in the preparation of the compounds of different metals and of different chain lengths.

The inhibiting effect of the metallic compounds in rubbers was determined with one-half inch dumbbell strips of approximately 100 gauge thickness. These were exposed to an ozone concentration of 60 parts per 100,000,000 parts of air. The apparatus used and the method of analyzing the ozone consumed are described in articles by Ford and Cooper appearing in India Rubber World 124, 696 (September 1951) and 125, 55 (October 1951), entitled A Study of the Factors Affecting the Weathering of Rubber-Like Materials—I and II. Two tests were conducted. In one test, the sample was repeatedly stretched between the limits of 0 and 20 per cent elongation at the rate of 108 cycles per minute. In the following table of test results, this test is called the dynamic test. The other test, the static test, was conducted with samples stretched to 12.5 percent elongation. The samples were exposed for seven hours at room temperature. No special lights were used. On completion of the test the samples were examined visually and the size of the cracks in each sample was compared with the size of the cracks in a blank. An arbitrary scale for measuring the size of the cracks was adopted using the figures 0, 1, 2, 3, 4 and 5 to represent respectively no visual cracking and cracks which were very fine, fine, medium, coarse, and very coarse.

The samples of natural rubber composition used in the test were compounded according to the following formula which is referred to herein as a blank:

| | Parts by weight |
|---|---|
| Pale crepe | 100 |
| White pigment and filler | 90.2 |
| Stearic acid | 1.2 |
| Sulfur | 3.0 |
| Accelerator | 0.9 |

The samples of GR–S (rubbery butadiene-styrene copolymer) were compounded according to the following formula which is referred to herein as a blank:

| | Parts by weight |
|---|---|
| GR–S | 100 |
| Zinc oxide | 3 |
| Carbon black | 45 |
| Plasticizer | 10 |
| Sulfur | 2 |
| Accelerator | 1.3 |

Two percent by weight of each of several metallic compounds of dialkyl thioureas were added to the respective formulae for these blanks to prepare the test stocks. Thus, there was used in Samples 1 and A of the following tables the cadmium chloride adduct of N,N'-diethyl thiourea, in Samples 2 and B the zinc chloride adduct of N,N'-diisopropyl thiourea, in Samples 3 and C the cadmium salt of N,N'-diisopropyl thiourea, and in Sample D the nickel salt of N,N'-diethyl thiourea. The first table records the results of testing certain of these samples in the ozone-containing atmosphere in the manner described in the article of Ford and Cooper. The size of the cracks is recorded according to the empirical table previously mentioned.

| | Artificial weathering, size of cracks | | Average improvement over blank (static and dynamic) |
|---|---|---|---|
| | Static | Dynamic | |
| Natural rubber: | | | |
| Blank | 2+ | 2+ | |
| Sample 1 | 1+ | 1+ | 1 |
| Sample 2 | 1+ | 1+ | 1 |
| Sample 3 | 1 | 0 | 1.5 |
| GR–S: | | | |
| Blank | 3 | 2+ | |
| Sample A | 2 | 2 | 0.5 |

The average improvement was determined by subtracting the sum of the numbers for each test sample from the sum of the numbers for the blank, and dividing by 2.

The development of cracks (as distinguished from crazing) has been found to be largely due to the ozone in the atmosphere. Therefore, samples of the stocks of the foregoing compositions were exposed to natural weathering in the sunlight, each sample being stretched 20 percent throughout the test. The sizes of cracks which developed were examined and the results are recorded below.

NATURAL WEATHERING

| | Size of cracks | Improvement |
|---|---|---|
| Natural rubber: | | |
| Blank | 3 | |
| Sample 1 | 2 | 1 |
| Sample 3 | 2 | 1 |
| GR–S: | | |
| Blank | 2+ | |
| Sample A | 1+ | 1 |
| Sample B | 1+ | 1 |
| Blank | 3 | |
| Sample C | 1+ | 2 |
| Blank | 4 | |
| Sample D | 1 | 3 |

In testing the synthetic, blanks of the same composition were used, but the tests were not run simultaneously, and in the different runs the blank was allowed to deteriorate to different extents.

The amount of the metallic compound used will ordinarily be within the limits of 0.1 and 10 parts per 100 parts of the rubber. The rubber composition may include wax, and this will ordinarily be desirable.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N'-disubstituted dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What we claim is:

1. A sulfur vulcanized rubber composition which includes as an inhibitor of decomposition a small amount of a metallic compound of a symmetrical disubstituted thiourea of the class consisting of salts and of adducts with a metal salt, each substituent being from the class consisting of alkyl and cycloalkyl groups containing up to nine carbon atoms, and the metal being bivalent and from the class consisting of nickel, cadmium, lead, tin and zinc.

2. The composition of claim 1 in which the inhibitor is an adduct of a metal halide.

3. The composition of claim 1 in which the inhibitor is an adduct of a metal nitrate.

4. The composition of claim 1 in which the inhibitor is an adduct of a metal acetate.

5. The composition of claim 1 in which the inhibitor is a salt which is free of inorganic acid radicals.

6. A sulfur vulcanized rubber composition which contains a small amount of the cadmium chloride adduct of a symmetrical disubstituted thiourea, each substituent being from the class consisting of alkyl and cycloalkyl groups containing up to nine carbon atoms.

7. A sulfur vulcanized rubber composition which contains a small amount of the zinc chloride adduct of a symmetrical disubstituted thiourea, each substituent being from the class consisting of alkyl and cycloalkyl groups containing up to nine carbon atoms.

8. A sulfur vulcanized rubber composition which contains a small amount of a cadmium salt of a symmetrical disubstituted thiourea, each substituent being from the class consisting of alkyl and cycloalkyl groups containing up to nine carbon atoms.

9. A sulfur vulcanized rubber composition which contains a small amount of a bivalent nickel salt of a symmetrical disubstituted thiourea, each substituent being from the class consisting of alkyl and cycloalkyl groups containing up to nine carbon atoms.

10. The process comprising sulfur vulcanizing rubber in the presence of a small amount of a metallic compound of a symmetrical disubstituted thiourea of the class consisting of salts and of adducts with a metal salt, each substituent being from the class consisting of alkyl and cycloalkyl groups containing up to nine carbon atoms, and the metal being bivalent and from the class consisting of nickel, cadmium, lead, tin and zinc.

11. The process of claim 10 in which the metallic compound is an adduct of a metal halide.

12. The process of claim 10 in which the metallic compound is an adduct of a metal nitrate.

13. The process of claim 10 in which the metallic compound is an adduct of a metal acetate.

14. The process of claim 10 in which the metallic compound is a salt which is free of inorganic acid radicals.

15. The process comprising sulfur vulcanizing rubber in the presence of a small amount of the cadmium chloride adduct of a symmetrical disubstituted thiourea, each substituent being from the class consisting of alkyl and cycloalkyl groups containing up to nine carbon atoms.

16. The process comprising sulfur vulcanizing rubber in the presence of a small amount of the zinc chloride adduct of a symmetrical disubstituted thiourea, each substituent being from the class consisting of alkyl and cycloalkyl groups containing up to nine carbon atoms.

17. The process comprising sulfur vulcanizing rubber in the presence of a small amount of a cadmium salt of a symmetrical disubstituted thiourea, the substituents being alkyl and cycloalkyl groups containing up to nine carbon atoms.

18. The process comprising sulfur vulcanizing rubber in the presence of a small amount of a bivalent nickel salt of a symmetrical disubstituted thiourea, the substituents being alkyl and cycloalkyl groups containing up to nine carbon atoms.

References Cited in the file of this patent

UNITED STATES PATENTS

| | | |
|---|---|---|
| 1,802,752 | Cadwell et al. | Apr. 28, 1931 |
| 2,480,814 | Punshon et al. | Aug. 30, 1949 |
| 2,615,030 | Chester | Oct. 21, 1952 |
| 2,726,254 | Leistner et al. | Dec. 6, 1955 |
| 2,727,917 | Mack et al. | Dec. 20, 1955 |

OTHER REFERENCES

Pfeiffer, "Organische Molekulverbendungen," pages 167–169, published 1927.

Karrer, "Organic Chemistry," 1938 Edition, page 209.